US00RE42081E

(19) United States
(12) Reissued Patent
Ueno

(10) Patent Number: US RE42,081 E
(45) Date of Reissued Patent: Jan. 25, 2011

(54) INFORMATION TRANSMISSION APPARATUS, TRAFFIC CONTROL APPARATUS, METHOD OF MANAGING BANDWIDTH RESOURCES USING THE SAME AND METHOD OF ADMITTING A CALL, USING VARIABLE-RATE ENCODING

(75) Inventor: Hideyuki Ueno, Tokyo (JP)

(73) Assignee: Kabushiki Kaisha Toshiba, Kawasaki-shi (JP)

(21) Appl. No.: 10/230,999

(22) Filed: Aug. 30, 2002

Related U.S. Patent Documents

Reissue of:
(64) Patent No.: 6,185,736
Issued: Feb. 6, 2001
Appl. No.: 08/941,034
Filed: Sep. 30, 1997

(30) Foreign Application Priority Data

Sep. 30, 1996 (JP) ..... 8-257917

(51) Int. Cl.
*H04N 7/173* (2006.01)

(52) U.S. Cl. ..... 725/95; 725/93; 725/116

(58) Field of Classification Search ..... 725/93, 725/95, 97, 116; 370/232, 468; 709/217–219; 455/3.1, 4.1, 4.2, 5.1, 6.1
See application file for complete search history.

(56) References Cited

U.S. PATENT DOCUMENTS 5,559,798 A * 9/1996 Clarkson et al. ..... 370/60.1
5,604,731 A * 2/1997 Grossglauser et al. ..... 370/232
5,822,530 A * 10/1998 Brown ..... 348/7 X
5,854,887 A * 12/1998 Kindell et al. ..... 348/7 X

FOREIGN PATENT DOCUMENTS

EP 0 739 114 A2 10/1996
JP 8-84339 3/1996
JP 8-298512 11/1996
JP 9-252303 9/1997

OTHER PUBLICATIONS

Applicant's Response filed Jul. 6, 1999 in response to Non–Final Rejection in 08/941,034—Date–stamped Filing Receipt, Cover Letter and Amendment.
Applicant's Response filed Feb. 9, 2000 in response to Non–Final Rejection in 08/941,034—Date–stamped Filing Receipt, Cover Letter, Petition for Extension of Time (2 Months) and Amendment with attachment.
Applicant's Response filed Aug. 25, 2000 in response to Final Rejection in 08/941,034—Date–stamped Filing Receipt, Cover Letter, Petition for Extension of Time (one month) and Amendment.
Applicant's Response filed Sep. 25, 2000 in response to Final Rejection in 08/941,034—Date–stamped Filing Receipt, Cover Letter, Petition for Extension of Time (2nd) and Amendment.

* cited by examiner

*Primary Examiner*—Hunter B. Lonsberry
(74) *Attorney, Agent, or Firm*—Oblon, Spivak, McClelland, Maier & Neustadt, L.L.P.

(57) ABSTRACT

A notification parameter file, which time-sequentially shows a characteristic of the transmission rate change corresponding to the durable time of a traffic, is notified to a network from a server comprising a storage medium storing data having a traffic characteristic ensured at a transmission starting time. The network adds the characteristic of the transmission rate change designated by the notified parameter to the traffic characteristic already admitted so as to determine whether or not the traffic is admitted. If the traffic can be admitted, the network allocates a transmission bandwidth resource to the sever based on the characteristic of the transmission rate change designated by the notified parameter.

53 Claims, 8 Drawing Sheets

FIG. 6A
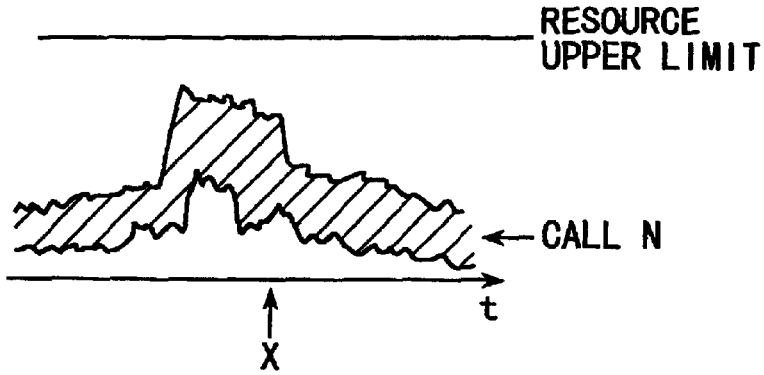
FIG. 6B
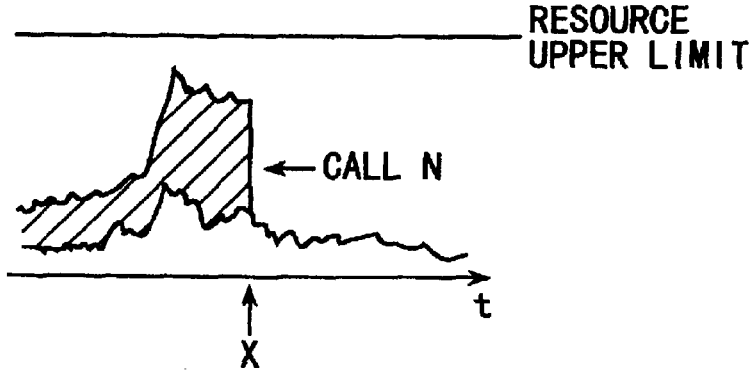
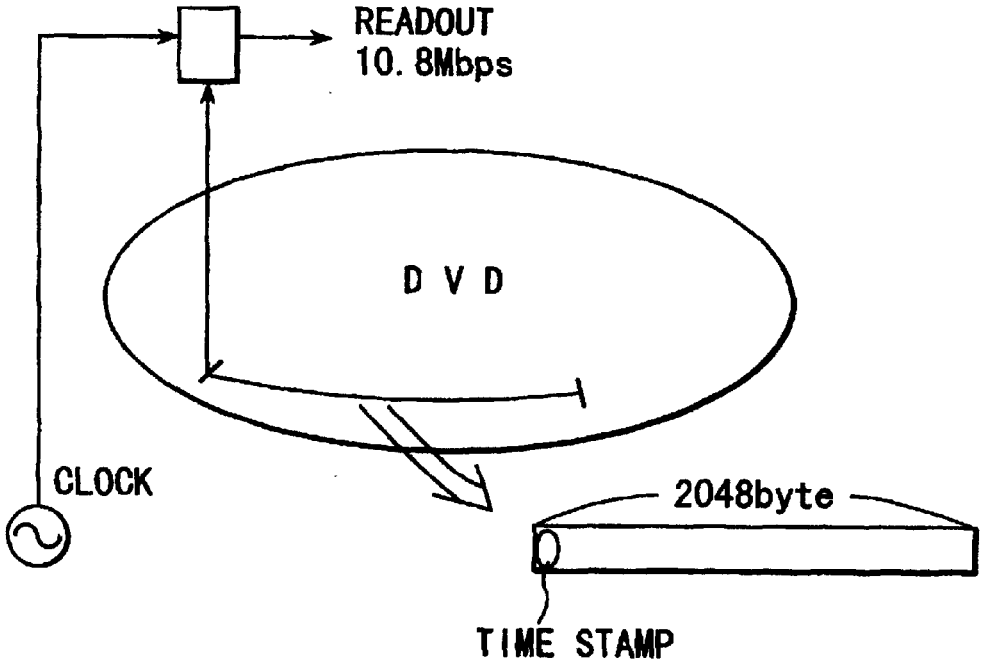
FIG. 7

INFORMATION TRANSMISSION APPARATUS, TRAFFIC CONTROL APPARATUS, METHOD OF MANAGING BANDWIDTH RESOURCES USING THE SAME AND METHOD OF ADMITTING A CALL, USING VARIABLE-RATE ENCODING

Matter enclosed in heavy brackets [ ] appears in the original patent but forms no part of this reissue specification; matter printed in italics indicates the additions made by reissue.

BACKGROUND OF THE INVENTION

The present invention relates to an information transmission apparatus such as a server used in a system for realizing service such as VOD (Video on Demand) in which stored media is reproduced at real time through a network, and a traffic control apparatus, and a method of managing bandwidth resources using the same and a method of admitting a call. Particularly, the present invention relates to an information transmission apparatus in a system in which information is transmitted by use of the storage media storing data, which is VBR (variable bit rate)-encoded, such as a DVD (digital versatile disk), a traffic control apparatus, a method of managing bandwidth resources using the same, and a method of admitting a call.

In recent years, an interactive video service for practical use is starting in accordance with high-speed and wide bandwidth resources of the network and the development of a digital image technique. VOD is one of typical example of such service. VOD can be explained as follows:

Specifically, one to one path connection is made between a video server having video sources and a receiver, which is called a set-top box. Thereby, an arbitrary video source is output based on a user's selection.

VOD is excellent in its operability. However, in consideration of the method of using the path for corresponding to VOD, necessary processing ability of video server, and an amount of contents to be supported, the reduction of the cost, which is necessary for presenting service, becomes an important matter.

In the field of consumer electronics, the sale of DVD is near at hand. DVD is a new video disk standard in which video information such as a movie can be recorded onto an optical disk having the same size as a CD (compact disk) with high picture quality by MPEG2, that is, video encoding. Video players for DVD or its contents packages are expected to be sold at a reasonable price to be widely used. If DVD can be used as the above-mentioned video server, the buildup cost of the video server can be expected to be largely reduced.

The recording and reproducing method of DVD is based on the concept of variable bit rate encoding in view of the point that both the image quality and recording time to capacity are ensured. The amount of encoding bits depends on the image quality of the original picture. The faster the motion scene is, the more the amount of data increases. In contrast, the conventional VOD was usually based on a CBR (constant-bit-rate)-encoded video source. The main reason is that there is not yet established the method of transmitting variable-bit-rate encoded video data, that is, VBR video through a network. This is also true to the field of ATM in which the VBR transmission is already defined, although it is assumed that many of the VOL) service use an ATM (Asynchronous Transfer Mode) in at least a core part of the network.

In ATM, several service classes are defined. For example, the following five classes are standardized in an ATM forum, which is the industrial standard setting organization for ATM.

Specifically, there are a CBR (Constant Bit Rate), a RT-VBR (Real Tune Variable Bit Rate), a NRT-VBR (Non-Real Time Variable Bit Rate), an ABR (Available Bit Rate), and an UBR (Unspecified Bit Rate).

Since the video transmission service needs a real time property, the CBR, which can ensure a constant rate type traffic, is generally used in the present state. The study of using the RT-VBR has be recently started.

Among the above five classes, the CBR and RT-VBR are guaranteed in their quality in view of real time. The CBR has an extremely low probability of cell discard and a high quality. However, a statistical multiplexed effect, which is particularly useful as an effective using method of managing the bandwidth resource, is not used in the ATM, the transmission cost of the CBR is high. The probability of cell discard of RT-VBR is higher than that of the CBR. However, since the CBR uses the statistical multiplexed effect, the transmission cost is lower than the CBR.

In the ATM, a call admission is executed as follows:

Specifically, a terminal notifies a traffic parameter to a network, and the exchanger of the network determines whether or not a call is admitted. After the call admission, the network polices whether or not the terminal outputs the traffic as keeping the notified parameter, and discard a violated traffic.

In the CBR, a notification parameter is a peak cell rate (PCR). The PCR is a parameter, which defines a maximum speed of one ATM connection. The bandwidth resource notified by PCR is constantly allocated to the network during the time when the call is set. In the CBR, since the bandwidth resource is sufficiently ensured, and the data communication is performed, a good image quality can be obtained. However, since no multiplex effect is used, the communication cost is high. In case when the VBR video such as DVD is transmitted, if the bandwidth resource is notified to adjust to the peak value of the variable rate transmission, the large number of portions where the allocated bandwidth resource is wasted is generated, the total transmission cost is unnecessarily increased. To efficiently use the allocated bandwidth resource, encoded data is once decoded, and re-encoded to set the source of the VBR to the source of the CBR. Or, the rate must be flattened by buffering. However, the encoding operation is generally executed in consideration of the buffer management of the receiver. Due to this, the above-mentioned flattening causes increase in the buffers of the receiver side, and the manufacturing cost is increased. In other words, there is actually difficulty in flattening the rate. In general, the rate is adjusted as described below to execute the re-encoding operation.

Specifically, data of the portion where bits are allocated at a rate, which is higher than a certain reference value, is partially deleted. Then, stuffing bits, which have no influence on decoding, are inserted to the portion where bits are allocated at a rate, which is lower than the certain reference value.

FIGS. 10A and 10B show the state of a rate adjustment process by the re-encoding operation. FIG. 10A shows a rate characteristic of the VBR-encoded video. As shown in FIG. 10B, data of the portion where bits are allocated at the higher rate than the PCR, which is the notification parameter of the CBR, is deleted (cross hatched portion of FIG. 10B). Then, stuffing bits are inserted to the portion where bits are allocated at the lower rate than the PCR (slanting lines of FIG.

10B). If the source of the VBR is transmitted at the CBR, the number of hardware for re-encoding is increased. Moreover, regarding the portion where bits are allocated at the higher rate in the original source, the amount of bits is decreased, so that the image quality is deteriorated.

The notification parameter of the RT-VBR, which is another service class, includes a sustainable cell rate (SCR) showing an average bit rate and a maximum burst size (MBS) corresponding to PCR durable time, in addition to the PCR. The exchanger uses an imaginary buffer (leaky bucket) and polices whether or not the buffer is full of information. In the leaky bucket, a maximum value of an input is restricted by the PCR, the output rate is the SCR, and the size is the MBS. Even if the VBR is used, data cannot always be transmitted in the form that the traffic characteristic of the VBR of the source is unchanged. The traffic characteristic must be shaped to the traffic characteristic of the VBR, which the network allows, when transmitting data. For example, suppose that a scene where bits are allocated at a rate close to the peak rate exists in the scenes recorded by DVD, and that the scene is contained for several seconds. In this case, time when the peak rate can continue at a transmission time is restricted by the MBS, and the transmission rate must be reduced for a certain period of time. This state is shown in FIGS. 11A and 11B. The cross hatched portion of FIG. 11B is data of a portion exceeding MBS. Regarding such data, the image quality is reduced due to the re-encoding operation. If the large MBS (maximum burst size) is allocated to prolong the period of time when the peak can continue, the wasteful allocation of the resource occurs similar to the case of CBR. This results in the rise of the transmission cost.

In the present notification parameter, in order to pass through the traffic, which the source originally has extra resources for safety must be provided to prevent congestion. This does not meet the demand for the manufacturing cost, and the traffic characteristic must be shaped in accordance with the network request. As a result, a hard load and the deterioration of the image quality occur.

Thus, in the framework of the existing network, when VBR data such as a motion picture is transmitted at real time in the existing ATM service class as a typical example, the following problems occur.

Specifically, in order to adjust the rate characteristic of encoded data to the CBR, encoded data must be once decoded and re-encoded in the CBR service class. As a result, the hard load on the server side occurs, and the image quality is largely deteriorated due to the re-encoding operation. Also, in the VBR service class, data cannot be transmitted at the rate characteristic, which the VBR source originally has, by policing. As a result, there occur the hard load and the deterioration of the image quality, even if which are not worse than the case of CBR. Therefore, the re-encoding operation and the rate adapting operation are needed.

BRIEF SUMMARY OF THE INVENTION

It is an object of the present invention to provide an information transmission apparatus, which can use variable rate storage media such as DVDs as video a sever without being re-encoded, and which can prevent a hard load of the sever side and deterioration of an image quality.

It is an object of the present invention to provide an information transmission apparatus which can efficiently perform a traffic management and a network management without changing a characteristic of a VBR source.

It is an object of the present invention to provide a, traffic control apparatus which can efficiently perform a traffic management and a network management without changing a characteristic of a VBR source.

It is an object of the present invention to provide a method of managing bandwidth resources using the above information transmission apparatus or traffic control apparatus, and a method of admitting a call.

According to the present invention, there is provided an information transmission apparatus comprising a holding section for holding a time series characteristic of a transmission rate of variable-rate-encoding data every storage medium or every variable-encoding data stored in the storage media: a notifying section for notifying the time series characteristic of the transmission rate, serving as a notification traffic parameter, which corresponds to variable-rate encoding data to be transmitted, to a network for executing a traffic control in accordance with a notification traffic parameter from a call side: and a transmission starting section for starting a transmission upon reception of a notification of connection setting from the network.

According to the present invention, there is provided a traffic controller comprising a receiving section for receiving a notification traffic parameter from an information transmission apparatus for transmitting variable-rate-encoding data stored in a storage medium: and a section for allocating a transmission bandwidth resource for a variable-rate transmission designated by a time series characteristic to the information transmission apparatus on the basis of the time series characteristic of a transmission rate notified thereby.

According to the present invention, there is provided a method of managing bandwidth resources wherein a time series characteristic corresponding to a predetermined transmission rate is notified as a traffic parameter from a video server such as a DVD storing VBR-encoded real time data and a bandwidth resource allocation is executed based on the traffic parameter.

According to the present invention, in an information transmission apparatus such as a server for transmitting variable-rate-encoding data stored in a storage medium to a client through a network where a traffic control is performed in accordance with the notification traffic parameter from a terminal, the information transmission apparatus comprises a holding section for holding a rime series characteristic of a transmission rate every storage medium or variable-rate-encoding data stored in the storage medium, and a notifying section for notifying the time series characteristic of the transmission rate, which corresponds to variable-rate-encoding data to be transmitted, as the notification traffic parameter.

In other words, in the information transmission apparatus, by use of the point that the traffic characteristic is ensured in advance in the service for transmitting information from the storage medium such as VOD, the traffic characteristic can be notified as a time series characteristic even if the traffic characteristic is VBR-encoded. The network side allocates the transmission bandwidth resources having the characteristic corresponding to the characteristic of the time series change of the transmission rate designated by the notified parameter.

As a result, it is not needed that the traffic characteristic, which VBR-encoded real rime data originally has, be forcibly adjusted to the other traffic characteristic due to the restriction of the network. Thereby, the traffic characteristic can be transmitted in a state that the characteristic of VBR source is unchanged. Moreover, the network side can easily manage and control the traffic, and the efficient management of the network resource can be executed.

The time series characteristic of the predetermined transmission rate corresponding to the VBR-encoded data to be transmitted can be generated as follows:

Specifically, an average read rate for every predetermined time distance is calculated based on the reading characteristic of VBR-encoded data read from the storage medium. The calculated average read rate is set in a time series manner.

In other words, every time when a new DVD medium is prepared in the server, the reading operation is executed. Then, the time series of the average read rate for every predetermined time distance may be maintained and managed as a notification traffic parameter.

If VBR-encoded data stored in the storage medium is motion picture data, the time series characteristic is preferably generated as follows:

Specifically, the average read rate for every one or more frame distance is calculated. The time series of the calculated average read rate is generated as the time series characteristic of the transmission rate.

Moreover, according to the present invention, there is provided a method of admitting a call, comprising the steps of notifying a time series characteristic of a predetermined transmission rate from an information transmission apparatus containing a storage medium storing real time data as a traffic parameter; and adding the traffic parameter notified in each exchanger on a path to a traffic characteristic already admitted to determine whether or not the traffic is admitted.

In this case, in the traffic admission determining step, the change of the addition result due to a difference of a traffic start timing from the information transmission apparatus should be preferably considered. Thereby, for example, the traffic start timing from the information transmission apparatus such as the server is shifted to timing at which the result of the addition is reduced. As a result, a refused call rate can be reduced. Moreover, in consideration of a transmission delay and a delay variation, it is determined whether or not the traffic is admitted. Furthermore, when the traffic is cut on the way, the traffic characteristic already admitted is modified based on a notification traffic parameter of the cut traffic. Thereby, the call admission can be more correctly controlled.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A and 6B are views explaining the principle of a traffic characteristic modification process, which is executed on the network side in the VOD system of FIG. 1;

FIG. 7 is a view explaining the raw traffic characteristic of DVD;

DETAILED DESCRIPTION OF THE INVENTION

An embodiment of the present invention will now be described with reference to the accompanying drawings.

The following explanation relates to the transmission of motion picture data. However, data is not always limited to the motion picture, and general real time data such as audio data, etc., may be used. Moreover, the explanation relates to a case in which an ATM network is mainly used. However, the present invention can be applied to a general packet network having a concept of QOS (Quality of Service).

First of all, the principle of the present invention will be explained with reference to FIGS. 1 and 2.

Figure 1:
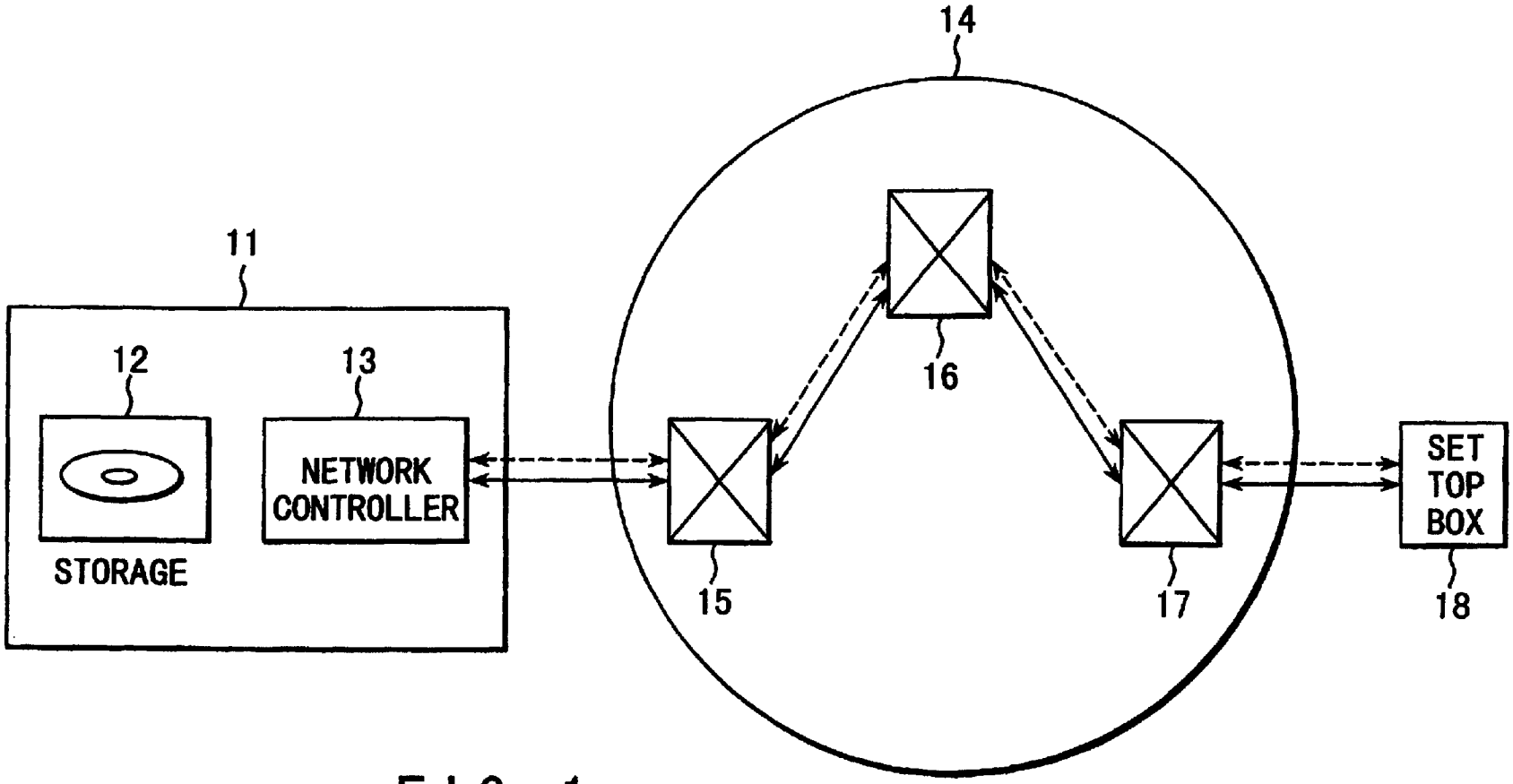
FIG. 1 is a block diagram showing the structure of a VOD system according to one embodiment of the present invention.
Figure 2:
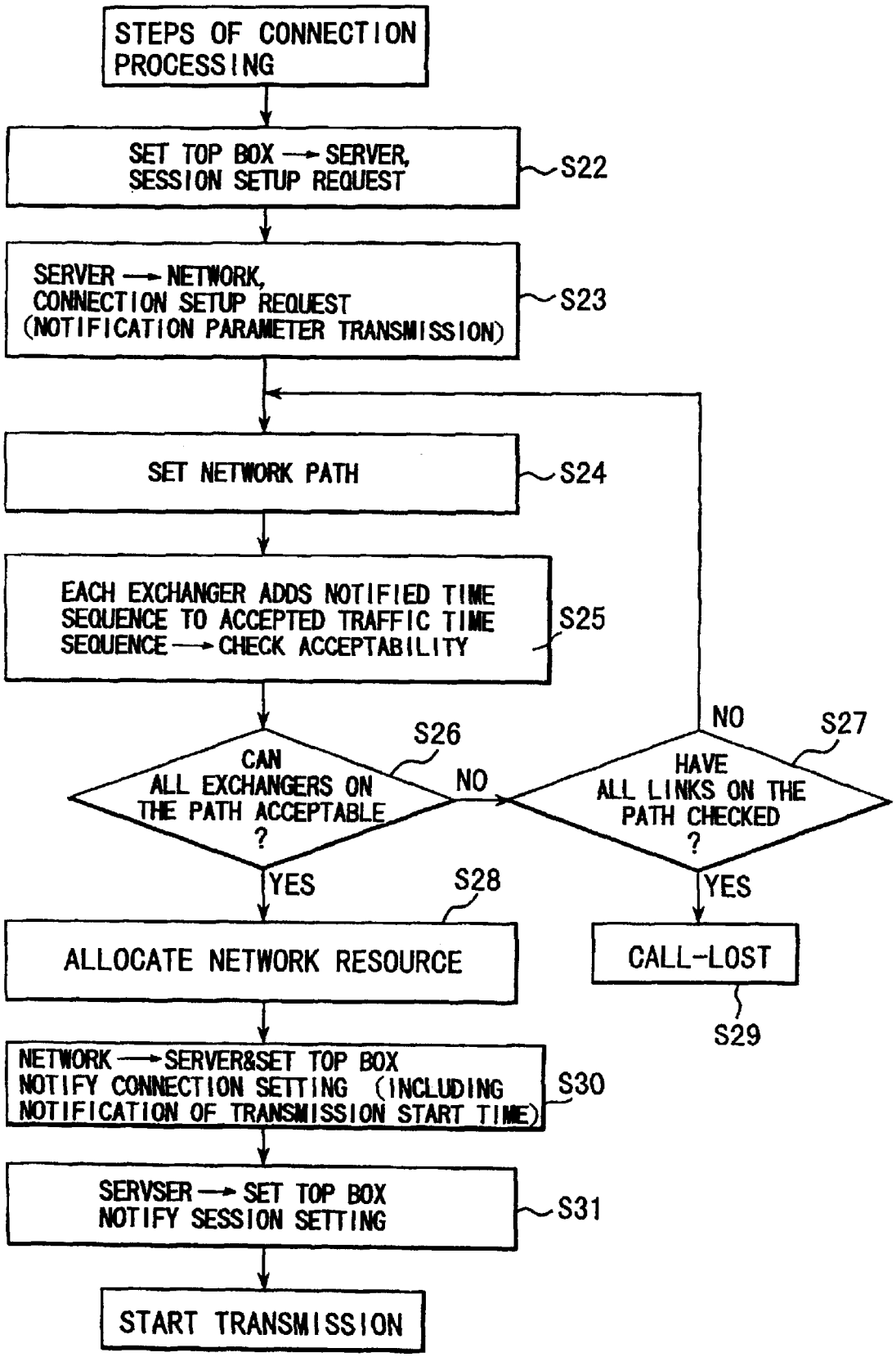
FIG. 2 is a flow chart showing the steps of a connection processing which is applied to the VOD system of FIG. 1.

FIG. 1 shows the entire VOD service system, which comprises a video server 11, a network 14, and a set top box 18. FIG. 2 is a flow chart showing a process of connecting between the video server 11 and the set top box 18.

The video server 11 comprises a storage 12, and a network controller 13. The storage 12 includes digital storage medium storing a video source, which is VBR (Variable-Bit-Rate)-encoded by MPEG 2 such as a DVD. The network controller 13 executes an operation control relating to a communication for transmitting the video source read from the storage 12 through a network 14. In the network controller 13, the time sequential characteristic of a predetermined transmission rate is maintained and managed every storage medium or every video source. The time sequential characteristic shows the change characteristic of the transmission rate, which the VBR-encoded video source has, in a time sequential manner.

An operation model of VOD is defined by a DAVIC, which is a consortium for standardizing a digital AV system. Regarding a VOD session, and a connection, as shown in steps S22 and S23 of FIG. 2, a request for setting the connection between the server and the network (step S23) from the video server 11 is executed based on a session setup request (step S22) from the set top box 18.

Figure 3:
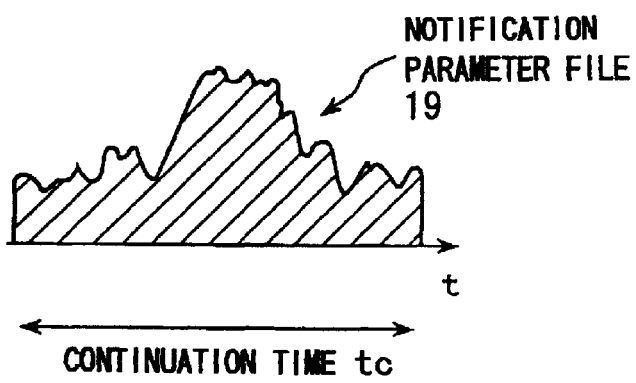
FIG. 3 is a view showing a traffic characteristic notified from a server in the VOD system of FIG. 1.

FIG. 1 shows only the portion relating to the connection, and the session is operated by a certain path (not shown), which has substantially no relation to the present invention. A solid line of FIG. 1 is a path through which an actual traffic passes, and a dotted line is a path through which signaling information passes. At the time of calling, the video server 11 prepares a transmission schedule of a variable rate in a form of a file as a time series of a transmission rate change (notification parameter file 19 of FIG. 3). The transmission schedule is prepared such that a receiving buffer of the set top box 18 is prevented from being broken and that the variable rate characteristic, which DVD has, is faithfully realized as possible. The transmission schedule is managed by the network controller 13 of the video server 11 as a time sequential characteristic of the predetermined transmission rate.

Generally, at the time of calling, the call side notifies the following traffic characteristic as a notification parameter. In the case of the CBR, the notification parameter is the PCR. In the case of the VBR, the notification parameter is the PCR, SCR, and MBS. In the system of this embodiment, the notification parameter to be sent in step S23 is the notification parameter file 19 in which the change of the transmission rate is shown in the time series manner. The notification parameter file 19 is prepared and maintained every storage medium. Or, when a plurality of video sources are stored in storage medium and access can be executed every video source, the notification parameter 19 is prepared and maintained every video source. By the notification parameter file 19 corresponding to the source designated from the set top box 18, the traffic characteristic is notified.

Figure 4:
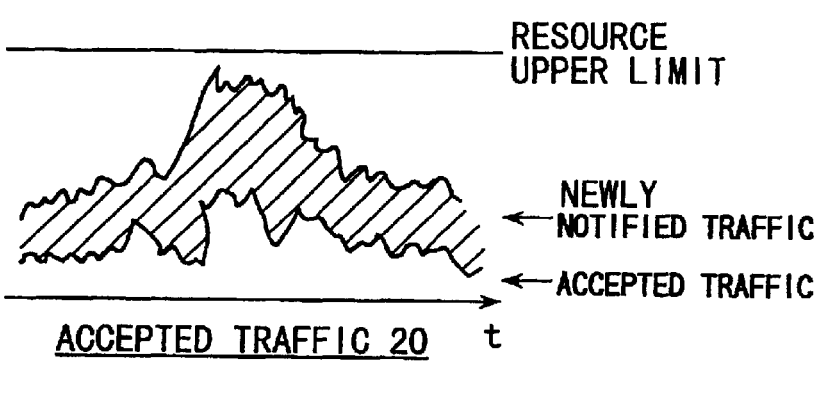
FIG. 4 is a view showing an admission traffic managed on a network side in the VOD system of FIG. 1.

When the network 14 receives the notification parameter 14, the network 14 determines a transmission path, which is from the video sever 11 to the set top box 18. Also, the network 14 determines whether or not the call is admitted. On the path of the normal network, there exists a plurality of exchangers (15, 16, 17). Generally, the path setting and the call admission are determined in parallel. In other words, in this case, it is assumed that all exchangers on the path should pass the admission traffic without any problem. In consideration of the length of the path and the point whether the respective exchangers can pass the traffic or not, the path of the network is determined (step S24). Only when all paths of the plurality of candidates of the paths available have to include one or more exchanger which cannot accept the traffic (No of step S26, Yes of step S27), this call is set to be a lost-call (step S29). In this embodiment, the exchangers 15 to 17 check the admitted time sequential file 19 of the transmission rate change to determine whether or not the traffic can be passed (step S25). In the respective exchangers, the accumulated traffic characteristic, which is relevant to this kind of call already admitted, is stored as time series (already accepted traffic 20 in FIG. 4). Each exchanger adds a time series of a transmission rate of a newly notified call (slanting line of FIG. 4) to the accumulated traffic characteristic. Then, when the time series of the sum does not exceed the upper limit of the resource at all time, each exchanger determines that the call is acceptable (step S25). The upper limit of the resource is an upper limit of the network bandwidth resource, which is mainly determined by the throughput of the exchanger, and which is the network bandwidth resource which can be allocated by the exchanger. The above operation is executed by each of the exchangers on the path using the admission traffic 20. When it is discriminated that the call is acceptable by all exchangers on the path, the call is admitted and the network resource is allocated to the call (step S28). The feature of this embodiment lies in the point that the allocated network resource is a determinative time function. Thereafter, the network 14 notifies the video server 11 and the set top box 18 through a signaling channel that the connection between the video server 11 and the set top box 18 is set (step S30). At this time, transmission start time is notified to the video server 11 and the set top box 18. Next, the video server 11 notifies the set top box 18 that a session is set (step S31), so that the transmission is started. At the time of starting the transmission, the video server 11 must keep transmission start time notified from the network, and the set top box 18 expects that transmission is started at the start time.

In the above-explanation, the calculation of the time series of the sum must be executed on the consumption that all exchangers have the same transmission start time. Due to this, in steps of FIGS. 2, information of the transmission timing is exchanged between the exchangers through the signaling channel in step S24 of network path setting.

If the above idea is further advanced, the following case can be considered:

Specifically, the call is rejected at a certain transmission timing. However, if the timing is a little shifted, there occurs a state that the call can be admitted.

Figure 5A:
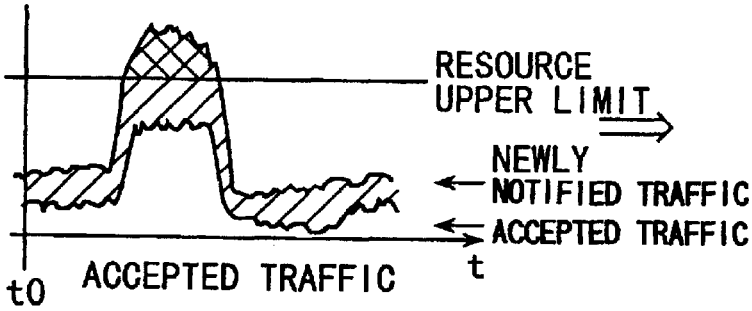
FIGS. 5A and 5B are views explaining the principle of a transmission start time change process, which is executed on the network side in the VOD system of FIG. 1.
Figure 5B:
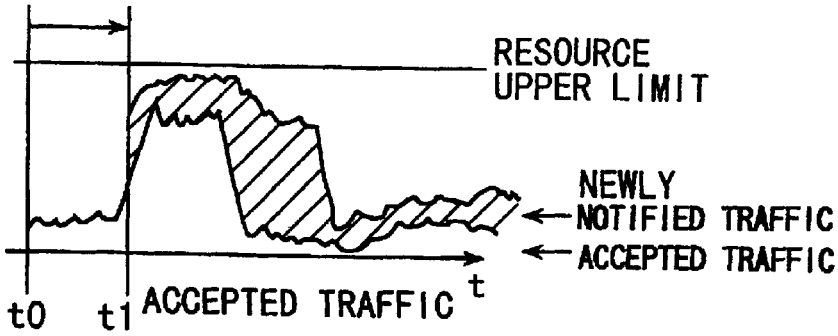

For example, if transmission time is shifted to t1 as shown in FIG. 5B, the call can be admitted even in a case that a certain exchanger can not accept the call at transmission start timing t0 as shown in FIG. 5A. Therefore, it is preferable that such a transmission timing be taken into consideration in determining the call admission.

Such transmission start time can be determined by various methods, and for example, the following methods can be considered:

Specifically, (1) transmission time is determined in a fixed period of time after the start of the connection processing; (2) the exchanger, which is the most severely occupied by the traffic, determines transmission time among the exchangers on the path; and (3) a certain exchanger (or controller) serves as a supervisor to optimize the entire traffic characteristic.

Then, information flowing for signaling is determined among the exchangers every method.

In the case of (1), the exchanger, which is directly linked to the video server 11, notifies connection request admission time to the other exchangers. In the case of (2), the parameter (peak durable time, etc) showing a bottle neck portion of the schedule is exchanged among the respective exchangers, so that the exchanger for determining transmission start time is decided. Thereafter, the exchanger sends information of transmission start time to the other exchanger. In the case of (3), each exchanger sends the information of already accepted traffic to the supervisor so as to receive transmission start time data. The more degree of freedom of information, which can be exchanged among the exchangers by the signaling, is increased, the more a call-lost rate can be reduced. However, there is a trade-off relation in terms of an increase in decision time, signaling information quantity.

The range where the transmission time can be shifted depends on a system design. The limit of shifting time may be set such that the network 14 can be negotiated with and the video server 11 or the set top box 18, or both. Moreover, the set top box 18 may present received information of transmission start timing to a user so that the usage of the system can be improved.

Moreover, as shown in FIGS. 6A and 6B, if a call N is cut on the way (point X in the figures), the following traffic characteristic relating to the call N of each exchanger on the path is canceled at the point. Thereby, the network resource can be made available for the following generated traffic. In other words, the actual network resource is released. At the same time, and admitted traffic data to be referred at the following call admission is modified. In order to realize this, each exchanger must maintain and manage the notified traffic characteristic every call. The above maintenance and management are naturally needed in view of the point that each call is policed based on the notified parameter.

Next, the following will explain a specific example of the time sequential file of the transmission rate.

First, the traffic characteristic of DVD will be explained with reference to FIG. 7.

On the DVD, a time stamp, which shows reading time, is written every sector of a fixed length (2048 bytes). The DVD player reads the sector at the peak rate (10.8 Mbps) of the disk reading when counting time by a clock reaches the written time. This determines a raw traffic characteristic from DVD. In consideration of the network transmission, this cannot be directly mapped for the following reasons:

Specifically, first, in the network transmission, there is a format for transmission. In the ATM (Asynchronous Transfer Mode), after buffering data corresponding to CS-PDU, the data must be mapped to the cell. Therefore, it is difficult to correctly transmit 2048 bytes in a burst manner at designated time.

Secondly, if raw time stamp data is sent as it is, the signaling information quantity will be huge.

Therefore, the following example of actual notification parameter can be considered:

Specifically, a time is divided into time windows, and an average bit rate of each window, which is obtained when the buffering is executed in each window range, is calculated based on the reading characteristic as actually reading data. Then, the time series obtained as a result of the calculation is set as a notification parameter. For example, the time window interval is set to one second, the average rate of each window is expressed by 10 bits, and the time series is set as a notification parameter. Then an amount of the notification parameter of a movie for two hours can be expressed as follows:

7200 seconds×10 bits/sec=72k bits.

In the DVD, the encoding is performed by use of the VBD buffer of MPEG2 video standard so as to prevent the receiving buffer from overflowing. Due to this, the receiving side must be prevented from being broken even if it is subjected to the smoothed traffic. Therefore, the transmission rate change characteristic of the time series shown by the notification parameter file 19 should be generated taking into consideration of the definition of VBV. Unless such a consideration is taken, there must be needed a buffer for compensating for smoothing for one second at the time of receiving and transmitting.

Figure 8A:
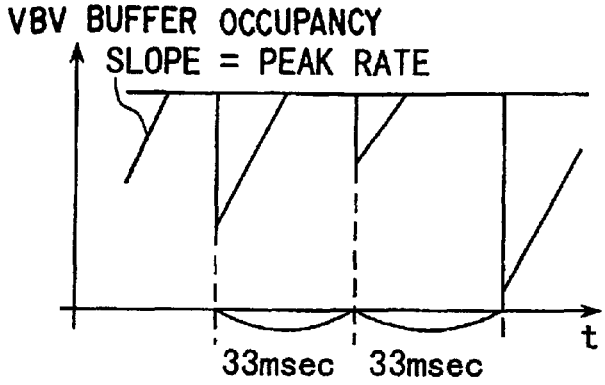
FIGS. 8A and 8B are views explaining the principle of a notification parameter generation in the server provided in the VOD system of FIG. 1.
Figure 8B:
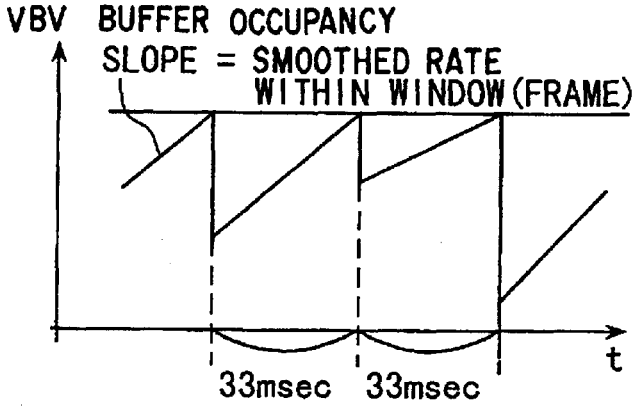

Next, it is assumed that the length of the window is set to the frame distance (=33 m sec) which is a unit of video encoding as shown in FIGS. 8A and 8B. In the model of DVD, the data reading from the disk (=data writing to VBV buffer) is executed at the peak rate. Due to this, the VBV definition is a schedule in which the peak rate of the data writing to the buffer is constant and writing time and non-writing time exist. If the writing time and the non-writing time are smoothed every frame and the VBV buffer is read out at the same timing as the case of DVD model, only the writing rate to the buffer is changed, and no unfavorable influence is exerted on the buffer schedule. As a result, the addition of the buffer, which is required in smoothing data, is unnecessary. Moreover, there is no need of modifying the schedule. In this case, the data quantity of the notification parameter is 30 times as large as the above-mentioned case of 72k bits, that is, about 2M bits. In this framework, even if the window size is set to be less than the frame distance, the only obtained change is that the information quantity of the notification parameter is increased, and there is no improvement.

Thus, the selection of the length of the window causes a trade-off relation in terms of difficulty of rescheduling and signaling information quantity. In this case, notification parameter information quantity can be further reduced by compression-encoding.

The above-explained notification parameter is calculated based on the pre-determined window size, every time when a new DVD source is set in the storage section 12. The calculated notification parameter is stored in the network controller 13 so as to be used at the calling time. If the plurality of video sources are included in the DVD, the notification parameter is calculated every video source.

It is needed that the window size be uniquely determined between the video server 11 and the network 14.

The above calculation must be executed in consideration of the following points:

Specifically, an increase in transmission rate due to the addition of a header, a trailer, and an error correction as required should be considered at the time of mapping to ATM. Also, it may be desirable that PS (program stream)of MPEG 2 system standard, which is the multiplex system used in DVD, be converted to TS (transport stream) of the same standard as a transmission method in view of the clock recovery. In this case, the change of the transmission rate caused by the conversion should be considered.

Figure 9A:
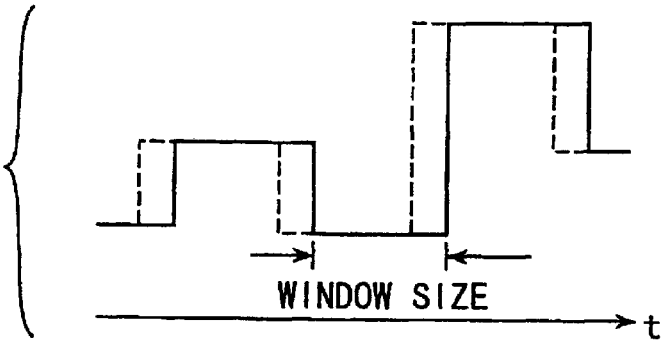
FIGS. 9A and 9B is views explaining a process in which a margin is formed to accept a call in the VOD system of FIG. 1.
Figure 9B:
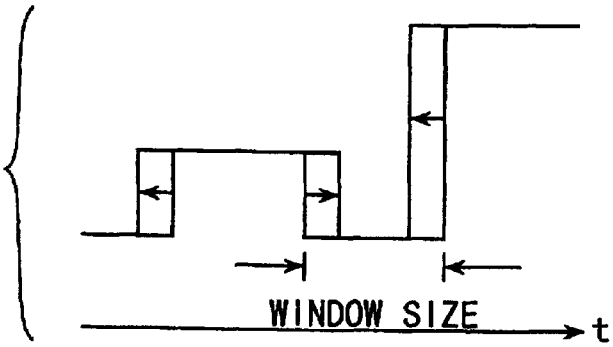
Figure 10A:
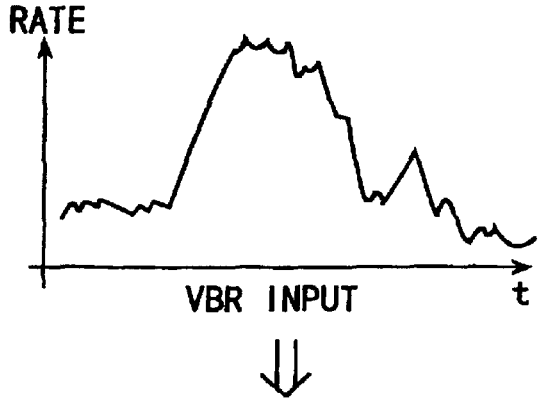
FIG. 10A PRIOR ART
FIGS. 10A and 10B are views explaining a problem of a CBR transmission in a conventional information transmission system.
Figure 10B:
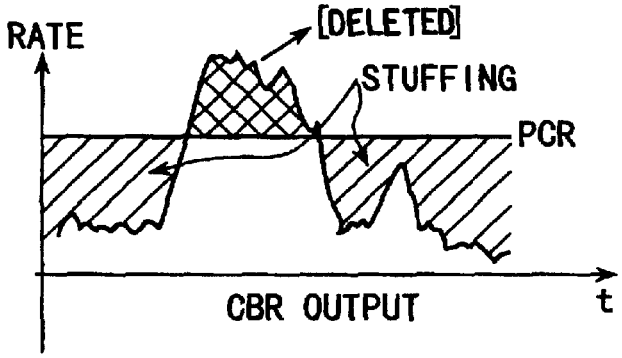
FIG. 10B PRIOR ART
Figure 11A:
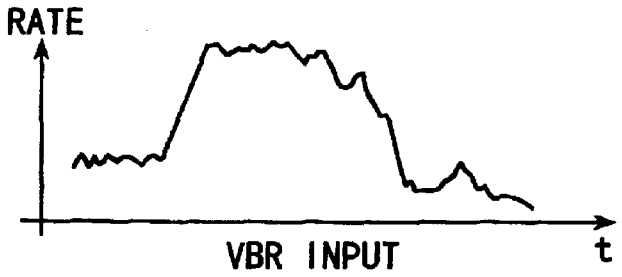
FIG. 11A PRIOR ART
FIGS. 11A and 11B are views explaining a problem of a VBR transmission in the conventional information transmission system.
Figure 11B:
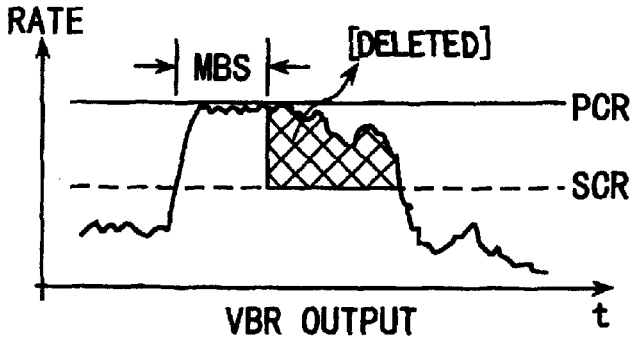
FIG. 11B PRIOR ART

Thus, if the characteristic of the traffic is defined, minutely speaking, a stepwise function can be established between the notification parameter 19 and the admission traffic 20 as shown in FIGS. 9A and 9B. Due to this, for reserving the traffic strictly, the shift of time should be severely checked. As shown in FIG. 9A, if the real data reaches as shown by a dottedline in spite of notifying it as shown by a solid line, there is possibility that the real traffic cannot be transmitted as expected.

Delay of the data transmission through the network and delay jitter can be considered as a cause of time shift. However, in the case of the network management as in the present invention, the traffic is scheduled in nearly an ideal manner as compared with the case of admission of the VBR service class. Ideally, this is equivalent to the case in which the peak rate is allocated to each call, so that the buffering at the exchanger is expected to be extremely small. As a result, the cell delay and its jitter is also expected to be small.

As another cause of time shift, there can be considered a problem in inconsistency of clocks.

Generally, the video server 11, the network 14, and the set top box 18 are operated by the different clock. Due to this, while the transmission side is trying to generate the traffic in accordance with the notification, the time axis may be shifted gradually. In consideration of the relationship between the video server 11 and the network 14 in the clock, there are two cases, one in which these clocks are synchronized with each other and the other in which these clocks are not synchronized with each other. If the clocks are synchronized with each other, the time series of the traffic characteristic and transmission start time are calculated based on time measured by the common clock. As a result, the scheduling becomes extremely correct, and no problem occurs. If the clocks are not synchronized with each other, there occurs a difference between the operation, which is expected by the network based on the notification, and the actual operation. As a result, unless a margin is formed anywhere, the server side will be policed while the server side is trying to transmit data in accordance with the notification.

In order to prevent this problem, there is one method in which a margin is added to the received notification characteristic in consideration of safety when each exchanger calculates the traffic characteristic of the sum to determine whether or not the calculation result is acceptable in step S25. There is another method in which the margin is considered where the video server side calculates notification parameter. By either method, the difference caused by the delay, the delay jitter, and the clock shift equivalent to the added margin can be absorbed.

Thus, according to the above-explained embodiment, in the case of the communication in which the storage medium is used as a source, the feature that the traffic characteristic is determined at the transmission starting time is utilized. The notification parameter file 19, which time-sequentially shows the characteristic of the transmission rate change corresponding to the durable time of the traffic time, is notified to the network 19 from the server 11. The network 14 executes the bandwidth resource allocation based on the characteristic of the transmission rate change designated by the notified parameter. Thereby, the transmission, which is adjusted to the characteristic of the source, and the efficient traffic management, and the running of the network can be executed.

Regarding the notification parameter, the time sequential characteristic showing the transmission rate generated by the above-mentioned method may be recorded in DVD, and this may be used as the notification parameter.

Figure 12:
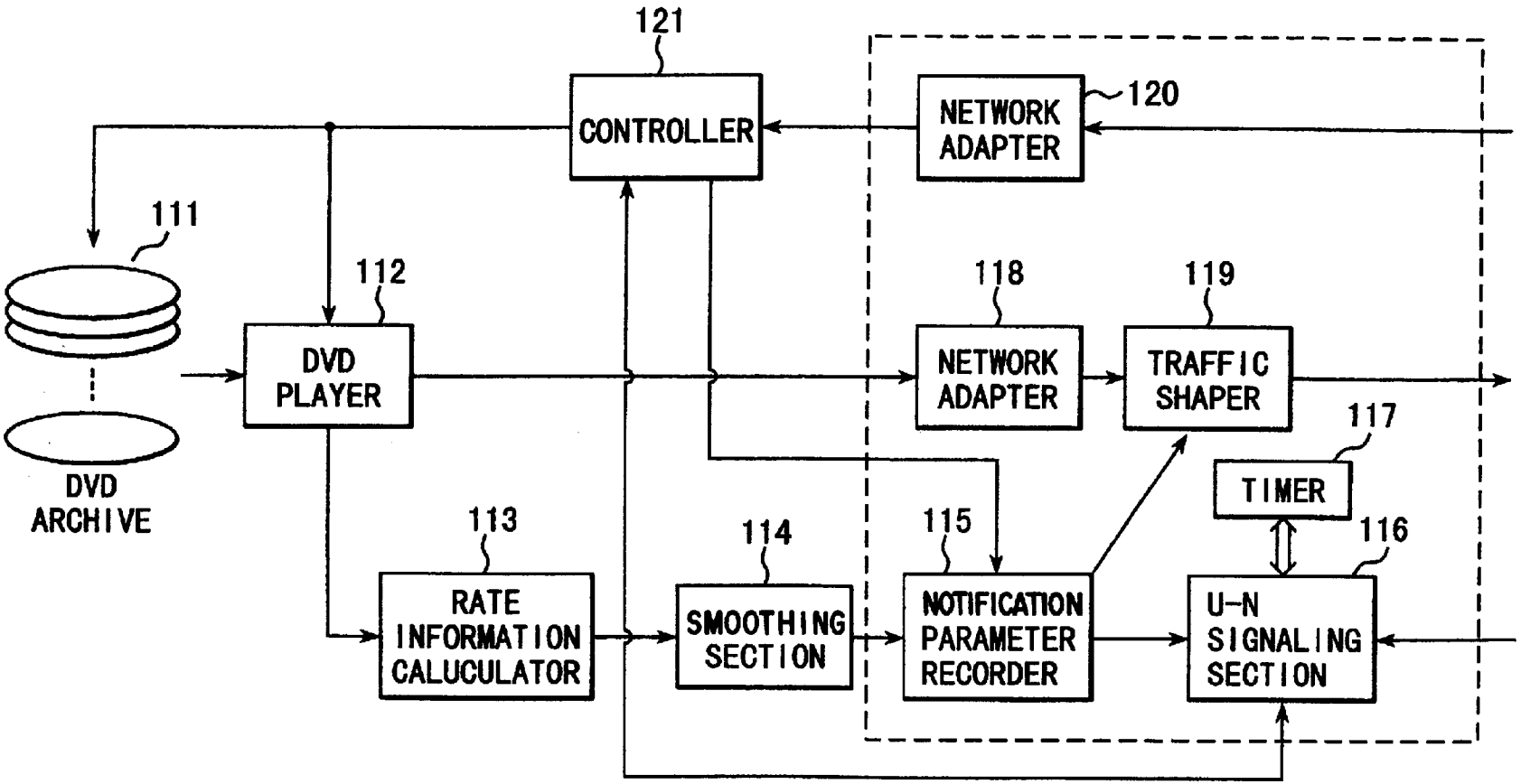
FIG. 12 is a block diagram of the video server of FIG. 1.

Next, the following will explain the structure of the video server, which executes the above-explained operation, with reference to FIG. 12.

FIG. 12 is a block diagram showing the embodiment of the structure of the video server. The main body of the storage section comprises a DVD archive 111 and a group of DVD players 112. When a new DVD is registered onto the DVD archive 111, information is read from the player, and the rate characteristic is calculated by a rate information calculator 113. For calculating the rate, an actual decoding is not necessarily required. Instead, a header for each picture is detected, and the number of bits included in each picture may be obtained.

Next, a smoothing section 114 smooths information, which corresponds to the above-mentioned window size. Then, the obtained traffic characteristic is stored in a notification parameter recorder 115 in a manner that the correspond between the DVD and the traffic characteristic clear. After this, the register DVD becomes access to the remote users. The access from the remote user is input to a controller 121 from a network adapter through the network. The controller 121 selects a requested DVD from the DVD archive in accordance with the remote user's request to be set in the DVD player, and notifies the selected content to the notification parameter recorder 115.

A parameter characteristic corresponding to the selected DVD is notified to the network by a U-N (User-Network) signaling section, so that the above mentioned negotiation can be carried out. If the call is admitted, data from DVD is transmitted through a network adapter 118. Since the traffic is the function of time, the transmission starting time is controlled by a timer 117. As collating with the notification parameter, the traffic characteristic after staring the transmission is policed by a traffic shaper 119, and shaped if necessary.

Figure 13:
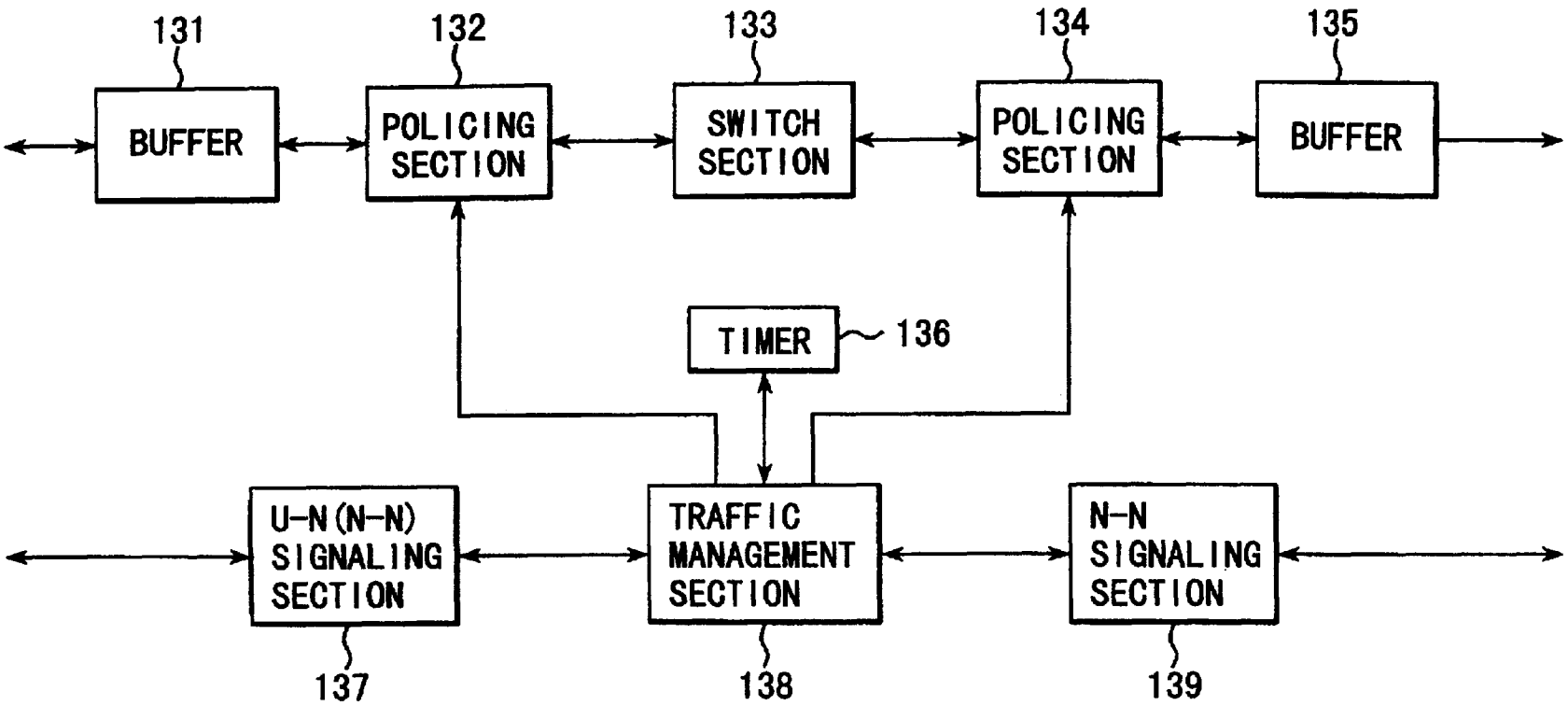
FIG. 13 is a block diagram of the exchanger of FIG. 1.

Next, the following will specifically explain the structure of the exchanger, which performs the above-explained operation, with reference to FIG. 13.

In the figure, user information is sent to the system including a buffer 131, a policing section 132, a switch section 133, and a buffer 135. Signaling information is sent to the system including a U-N (N-N) signaling section 137, a traffic management section 138, and an N-N signaling section 139. In either system, only one link is shown in the figure. However, in actual, the number of systems, which corresponds to the number of the ports of the exchangers, are connected to the switch section. The number of signaling paths are also provided to correspond to the number of the ports. When the video server calls, the previous notification parameter is sent from the video server through the U-N signaling section (a case in which the exchanger directly links to the video server) or N-N (Network-Network) signaling section 137 (a case in which the exchanger does not directly link to the video server), and the negotiation is started.

The traffic management section 138 adds the already admitted traffic characteristic and newly notified traffic characteristic to each other. Then, the traffic management section 138 determines whether or not the traffic management section 138 itself can accept the call. The traffic management section 138 negotiates with the exchanger on the path through an N-N signaling section 139. Similar to the explanation of the server, since the traffic is the function of time, the timer 136 controls timing of call admission. After the call is admitted, data of DVD is passed through the system of the circuit elements 131 to 135. In this case, the policing section 132 polices the traffic in the right direction, and the policing section 134 polices the traffic in the left direction. As a result, policing sections 132 and 134 discard notification violation data in accordance with the notified traffic characteristic. Thus, the traffic, which the exchanger itself does not expect, is surely discarded by policing. As a result, the bandwidth resource of the traffic as notified can be ensured as in a contract.

Thus, according to the present invention, the variable bit rate storage medium such as DVD can be used as the video server without performing the re-encoding operation. In this case, in the storage system, the traffic characteristic necessary for a transmission is ensured in advance. Thereby, the traffic management such as traffic characteristic notification, call admission, and decision of path, etc. are carried out. As a result, the transmission, which is adjusted to the characteristic of the source, and the efficient traffic management, and the running of the network can be executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An information transmission apparatus comprising:

holding means for holding a time series characteristic representing a change of a transmission rate corresponding to a continuation time of a traffic every storage medium or every variable-rate-encoded data stored in the storage medium;

notifying means for once notifying, at a time of calling, a network of a notification traffic parameter indicating the time series characteristic to start a negotiation in accordance with the notification traffic parameter from a calling side;

transmission starting means for starting a transmission upon reception of a notification of connection setting from said network; and time series characteristic generating means for calculating an average reading rate for every predetermined time interval based on a read characteristic of variable-rate coding data read from said storage medium to generate a time series of the average reading rate as a time series characteristic.

2. The apparatus according to claim 1, wherein variable-rate encoding data stored in said storage medium is motion picture data, and said time series characteristic generating means calculates an average reading rate for every one frame distance or more, and generates the time series of the average reading rate as the time series characteristic of said transmission rate.

3. A traffic controller comprising:

receiving means for receiving a notification traffic parameter from an information transmission apparatus for transmitting variable-rate-encoded data stored in a storage medium, the notification traffic parameter indicating a time series characteristic representing a change of a transmission rate corresponding to a continuation time of a traffic, wherein said information transmission apparatus is requesting to generate new traffic;

means for allocating a transmission bandwidth resource for a variable-rate transmission designated by the time series characteristic to said information transmission apparatus on the basis of the time series characteristic; and means for executing a setting of a path to said information transmission apparatus and a determination of a call admission in parallel, wherein said determining means includes means for shifting transmission start time to be capable of admitting the call.

4. The traffic controller according to claim 3, further comprising means for adding the time series characteristic of the transmission rate notified by said information transmission apparatus to a traffic characteristic already accepted so as to determine whether or not the traffic from said information transmission apparatus is admitted based on the result of the addition.

5. The traffic controller according to claim 3, further comprising means for determining whether or not the traffic can be passed in accordance with the admitted transmission rate.

6. The data transmission apparatus according to claim 1, wherein said storage medium includes a recording medium storing a video source variable-rate-encoded by MPEG2.

7. The data transmission apparatus according to claim 1, wherein said notifying means prepares a transmission schedule of a variable rate for realizing a variable-rate characteristic of said storage medium as faithful as possible in a form of a file containing a time series of the transmission rate change, and said notifying means manages the file as a time series characteristic of a predetermined transmission rate.

8. A method of admitting a call, comprising the steps of:

[notifying] *issuing* a traffic parameter from an information transmission apparatus containing a storage medium storing real time data, the traffic parameter indicating a time series characteristic representing a change of a transmission rate corresponding to a continuation time of a traffic; and adding the traffic parameter [notified] in each exchanger on a path to a traffic characteristic already admitted, to determine whether or not said traffic is admitted, wherein the step of adding the traffic parameter includes a step of determining whether or not said traffic is admitted in consideration of a change of the addition result due to a difference of a traffic start timing from said information transmission apparatus.

9. A method of admitting a call, comprising the steps of:

[notifying] *issuing* a traffic parameter from an information transmission apparatus containing a storage medium storing real time data, the traffic parameter indicating a time series characteristic representing a change of a transmission rate corresponding to a continuation time of a traffic; and adding the traffic parameter [notified] in each exchanger on a path to a traffic characteristic already admitted, to determine whether or not said traffic is admitted, wherein the step of adding the traffic parameter includes a step of determining whether or not said traffic is admitted in consideration of a transmission delay and a delay variation.

10. The method according to claim 8, wherein when said traffic is cut on the way, said traffic characteristic already admitted is modified based on a notification traffic parameter of the cut traffic.

11. An information transmission apparatus according to claim 1, which further comprises means for controlling an actual transmitted traffic to conform with the notification traffic parameter after starting the transmission.

12. The traffic controller according to claim 3, further comprises policing means for discarding notification violation data in accordance with a notified traffic characteristic.

13. An information transmission apparatus comprising:

a holding section which holds a time series characteristic representing a change of a transmission rate corresponding to a continuation time of a traffic every storage medium or every variable-rate-encoded data stored in the storage medium;

a notifying section which once notifies, at a time of calling, a network of a notification traffic parameter indicating the time series characteristic to start a negotiation in accordance with the notification traffic parameter from a calling side; and a transmission starting section which starts a transmission upon reception of a notification of connection setting from said network; and a time series characteristic generating section which calculates an average reading rate for every predetermined time interval based on a read characteristic of variable-rate coding data read from said storage medium to generate a time series of the average reading rate as a time series characteristic.

14. An information transmission apparatus according to claim 13, which further comprises a control section configured to control an actual transmitted traffic to conform with the notification traffic parameter.

15. The apparatus according to claim 13, wherein variable-rate encoding data stored in said storage medium is motion picture data, and said time series characteristic generating section calculates an average reading rate for every one frame distance or more, and generates the time series of the average reading rate as the time series characteristic of said transmission rate.

16. The data transmission apparatus according to claim 13, wherein said storage medium includes a recording medium storing a video source variable-rate-encoded by MPEG2.

17. The data transmission apparatus according to claim 13, wherein said notifying section prepares a transmission schedule of a variable rate for realizing a variable-rate characteristic of said storage medium as faithful as possible in a form of a file containing a time series of the transmission rate change, and said notifying section manages the file as a time series characteristic of a predetermined transmission rate.

18. A traffic controller comprising:

a receiver section which receives a notification traffic parameter from an information transmission apparatus for transmitting variable-rate-encoded data stored in a storage medium, the notification traffic parameter indicating a time series characteristic representing a change of a transmission rate corresponding to a continuation time of a traffic, wherein said information transmission apparatus is requesting to generate a new traffic;

a bandwidth allocating section which allocates a transmission bandwidth resource for a variable-rate transmission designated by a time series characteristic to said information transmission apparatus on the basis of the time series characteristic of a transmission rate notified thereby; and an admission determining section which executes a setting of a path to said information transmission apparatus and a determination of a call admission in parallel, wherein said admission determining section includes a shifting section configured to shift transmission start time to be capable of admitting the call.

19. The traffic controller according to claim 18, further comprising an admission determining section which adds the series characteristic of the transmission rate notified by said information transmission apparatus to a traffic characteristic already accepted and determines whether or not the traffic from said information transmission apparatus is admitted based on the result of the addition.

20. The traffic controller according to claim 18, further comprising a determining section which determines whether or not the traffic can be passed in accordance with the admitted transmission rate.

21. The traffic controller according to claim 18, further comprises a policing section which discards notification violation data in accordance with a notified traffic characteristic.

22. An information transmission apparatus comprising:

holding means for holding a time series characteristic of a transmission rate of variable-rate-encoding data every storage medium or every variable-encoding data stored in the storage medium;

notifying means for once notifying a network of the time series characteristic, serving as a notification traffic parameter, which corresponds to variable-rate-encoding data to be transmitted, for executing a traffic control in accordance with a notification traffic parameter from a calling side;

transmission starting means for starting a transmission upon reception of a notification of connection setting from said network; and time series characteristic generating means for calculating an average reading rate for every predetermined time interval based on a read characteristic of variable-rate-encoding data read from said storage medium to generate a time series of the average reading rate as a time series characteristic.

23. The apparatus according to claim 22, wherein variable-rate-encoding data stored in said storage medium is motion picture data, and said time series characteristic generating means calculates an average reading rate for every one frame distance or more, and generates the time series of the average reading rate as the time series characteristic of said transmission rate.

24. The data transmission apparatus according to claim 22, wherein said storage medium includes a recording medium storing a video source variable-rate-encoded by MPEG2.

25. The data transmission apparatus according to claim 22, wherein said notifying means prepares a transmission schedule of a variable rate for realizing a variable-rate characteristic of said storage medium as faithful as possible in a form of a file containing a time series of the transmission rate change, and said notifying means manages the file as a time series characteristic of a predetermined transmission rate.

26. A traffic controller comprising:

receiving means for receiving a notification traffic parameter from an information transmission apparatus for transmitting variable-rate-encoding data stored in a storage medium, wherein said information transmission apparatus is requesting to generate new traffic;

means for allocating a transmission bandwidth resource for a variable-rate transmission designated by a time series characteristic to said Information transmission apparatus on the basis of the time series characteristic of a transmission rate notified thereby; and means for executing a setting of a path to said information transmission apparatus and a determination of a call admission in parallel, said means for executing including means for shifting transmission start time to be capable of admitting the call.

27. The traffic controller according to claim 26, further comprising means for determining whether or not the traffic parameter can be passed in accordance with the admitted transmission rate.

28. A method of admitting a call, comprising:

[notifying] *issuing* a time series characteristic of a predetermined transmission rate from an information transmission apparatus containing a storage medium storing real time data as a traffic parameter when a call is requested by said information transmission apparatus; and adding the traffic parameter [notified] in each exchanger on a path to a traffic characteristic already admitted, to determine whether or not said call is admitted in consideration of a change of the addition result due to a difference of a traffic start timing from said information transmission apparatus.

29. A method of admitting a call, comprising:

[notifying] *issuing* a time series characteristic of a predetermined transmission rate from an information transmission apparatus containing a storage medium storing real time data as a traffic parameter when a call is requested by said information transmission apparatus; and adding the traffic parameter [notified] in each exchanger on a path to a traffic characteristic already admitted, to determine whether or not said call is admitted in consideration of a transmission delay and a delay variation.

30. An information transmission apparatus comprising:

a holding section which holds a time series characteristic of a transmission rate of variable-rate-encoding data every storage medium or every variable-encoding data stored in the storage medium;

a notifying section which once notifies a network of the time series characteristic of the transmission rate, serving as a notification traffic parameter, which corresponds to variable-rate-encoding data to be transmitted, for executing a traffic control in accordance with a notification traffic parameter from a calling side;

a transmission starting section which starts a transmission upon reception of a notification of connection setting from said network; and a time series characteristic generating section which calculates an average reading rate for every predetermined time interval based on a read characteristic of variable-rate-encoding data read from said storage medium to generate a time series of the average reading rate as a time series characteristic.

31. The apparatus according to claim 30, wherein variable-rate-encoding data stored in said storage medium is motion picture data, and said time series characteristic generating section calculates an average reading rate for every one frame distance or more, and generates the time series of the average reading rate as the time series characteristic of said transmission rate.

32. A traffic controller comprising:

a receiver section which receives a notification traffic parameter from an information transmission apparatus for transmitting variable-rate-encoding data stored in a storage medium wherein said information transmission apparatus is requesting to generate a new traffic;

a bandwidth allocating section which allocates a transmission bandwidth resource for a variable-rate transmission designated by a time series characteristic to said information transmission apparatus on the basis of the time series characteristic of a transmission rate notified thereby; and an admission determining section which executes a setting of a path to said information transmission apparatus and a determination of a call admission in parallel and includes a shifting section configured to shift transmission start time to be capable of admitting the call.

*33. An information transmission apparatus comprising:*

*means for holding a time series characteristic representing a change of a transmission rate corresponding to a transmission continuation time for a storage medium or for a variable-rate-encoded data file stored in the storage medium;*

*means for once notifying, at a time of calling, a network of a notification traffic parameter corresponding to the time series characteristic so as to start a negotiation in accordance with the notification traffic parameter from a calling side;*

*means for starting a transmission upon reception of a notification of connection setting from said network; and*

*time series characteristic generating means for calculating an average reading rate for every predetermined time interval based on a read characteristic of variable-rate coding data read from said storage medium to generate a time series of the average reading rate as a time series characteristic,*

*wherein the transmission continuation time is a time span for transmission of all segments of a given transmission.*

*34. The data transmission apparatus according to claim 33, wherein:*

*said storage medium includes a recording medium storing a video source variable-rate encoded by MPEG2.*

*35. The data transmission apparatus according to claim 33, wherein said notifying means comprises:*

*means for preparing a variable rate transmission schedule, substantially corresponding to a variable-rate characteristic of said storage medium in a form of a transmission schedule file containing a time series characteristic of a transmission rate change; and*

*means for managing the transmission schedule file as a time series characteristic of a predetermined transmission rate.*

*36. An information transmission apparatus according to claim 33, comprising:*

*means for controlling an actual transmitted traffic to conform with the notification traffic parameter after starting the transmission.*

*37. A traffic controller comprising:*

*means for receiving a notification traffic parameter from an information transmission apparatus for transmitting variable-rate-encoded data stored in a storage medium, the notification traffic parameter corresponding to a time series characteristic representing a change of a transmission rate corresponding to a transmission continuation time; and*

*means for allocating a transmission bandwidth resource for a variable-rate transmission to said information transmission apparatus on the basis of the time series characteristic,*

*means for executing a setting of a path to said information transmission apparatus and a determination of a call admission in parallel,*

*wherein said means for executing includes means for shifting transmission start time to be capable of admitting the call, and*

*wherein the transmission continuation time is a time span for transmission of all segments of a given transmission.*

*38. The traffic controller according to claim 37, comprising:*

*means for adding the time series characteristic to a traffic characteristic already accepted.*

*39. The traffic controller according to claim 37, comprising:*

*means for setting a path to said information transmission apparatus and, in parallel, determining a call admission.*

*40. The traffic controller according to clam 37, comprising:*

*means for determining whether the traffic can be passed in accordance with an admitted transmission rate.*

*41. The traffic controller according to claim 37, comprising:*

*means for discarding notification violation data in accordance with a notified traffic characteristic.*

*42. A method of managing bandwidth resources, comprising:*

*issuing a notification traffic parameter from an information transmission apparatus containing a storage medium storing real time data, the notification traffic parameter corresponding to a time series characteristic representing a change of a transmission rate corresponding to a transmission continuation time; and*

*allocating a transmission bandwidth resource to the real time data based on the notification traffic parameter,*

*wherein the transmission continuation time is a time span for transmission of all segments of a given transmission.*

*43. A method of admitting a call, comprising:*

*issuing a traffic parameter from an information transmission apparatus containing a storage medium storing*

*real time data, the traffic parameter corresponding to a time series characteristic representing a change of a transmission rate corresponding to a transmission continuation time; and*

*adding the traffic parameter to a traffic characteristic already admitted,*

*wherein the step of adding the traffic parameter includes a step of determining whether or not said traffic is admitted in consideration of a change of the addition result due to a difference of a traffic start timing from said information transmission apparatus, and*

*wherein the transmission continuation time is a time span for transmission of all segments of a given transmission.*

*44. The method according to claim 43, comprising:*

*modifying said traffic characteristic when said traffic is cut based on a cut traffic notification parameter.*

*45. An information transmission apparatus comprising:*

*a holding section configured to hold a time series characteristic representing a change of a transmission rate corresponding to a transmission continuation time for a storage medium or for a variable-rate-encoded data file stored in the storage medium;*

*a notifying section configured to once notify, at a time of calling, a network of a notification traffic parameter corresponding to the time series characteristic so as to start a negotiation in accordance with the notification traffic parameter from a calling side; and*

*a transmission starting section configured to start a transmission upon reception of a connection notification setting from said network; and*

*a time series characteristic generating section which calculates an average reading rate for every predetermined time interval based on a read characteristic of variable-rate coding data read from said storage medium to generate a time series of the average reading rate as a time series characteristic,*

*wherein the transmission continuation time is a time span for transmission of all segments of a given transmission.*

*46. An information transmission apparatus according to claim 45, comprising:*

*a control section configured to control an actual transmitted traffic to conform with the notification traffic parameter.*

*47. The data transmission apparatus according to claim 45, wherein:*

*said storage medium includes a recording medium configured to store a video source variable-rate-encoded by MPEG2.*

*48. The data transmission apparatus according to claim 45, wherein:*

*said notifying section is configured to prepare a transmission schedule of a variable rate for realizing a variable-rate characteristic of said storage medium as faithful as possible in a form of a transmission schedule file containing a time series of the transmission rate change, and is configured to manage the transmission schedule file as a time series characteristic of a predetermined transmission rate.*

*49. A traffic controller comprising:*

*a receiver section configured to receive a notification traffic parameter from an information transmission apparatus configured to transmit variable-rate-encoded data stored in a storage medium, the notification traffic parameter corresponding to a time series characteristic representing a change of a transmission rate corresponding to a transmission continuation time;*

*a bandwidth allocating section configured to allocate a transmission bandwidth resource for a variable-rate transmission, designated by a variable rate transmission time series characteristic, to said information transmission apparatus on the basis of variable rate transmission of the time series characteristic; and*

*an admission determining section which executes a setting of a path to said information transmission apparatus and a determination of a call admission in parallel,*

*wherein said admission determining section includes a shifting section configured to shift transmission start time to be capable of admitting a call, and*

*wherein the transmission continuation time is a time span for transmission of all segments of a given transmission.*

*50. The traffic controller according to claim 49, comprising:*

*an admission determining section configured to add the time series characteristic of the transmission rate notified by said information transmission apparatus to a traffic characteristic already accepted and to determine whether the traffic from said information transmission apparatus is admitted.*

*51. The traffic controller according to claim 50, comprising:*

*a second admission determining section configured to set a path to said information transmission apparatus and, in parallel, to determine a call admission.*

*52. The traffic controller according to claim 49, comprising:*

*a determining section configured to determine whether the traffic can be passed in accordance with the admitted transmission rate.*

*53. The traffic controller according to claim 49, comprising:*

*a policing section configured to discard notification violation data in accordance with a notified traffic characteristic.*

* * * * *